United States Patent [19]

Moore

[11] Patent Number: 5,909,500
[45] Date of Patent: Jun. 1, 1999

[54] METHOD AND APPARATUS FOR DETECTING FORGED SIGNATURES

[76] Inventor: Steven Jerome Moore, 58 Butterfield Rd., Newtown, Conn. 06470

[21] Appl. No.: 09/046,820

[22] Filed: Mar. 24, 1998

Related U.S. Application Data

[63] Continuation-in-part of application No. 08/599,397, Jan. 2, 1996, abandoned.

[51] Int. Cl.⁶ .................................. G06K 9/52; G06K 9/20
[52] U.S. Cl. ............................ 382/123; 382/174; 382/204
[58] Field of Search ..................................... 382/119, 123, 382/137, 186, 203, 204, 174, 182, 187, 101, 179, 116, 177, 189, 193, 199, 200; 348/161; 283/57, 58; D19/11; 235/3; 434/155

[56] References Cited

U.S. PATENT DOCUMENTS

| | | | |
|---|---|---|---|
| 4,634,148 | 1/1987 | Greene | ........................................ 283/70 |
| 5,042,073 | 8/1991 | Collot et al. | ................................. 382/3 |
| 5,563,959 | 10/1996 | Gallo et al. | .............................. 382/187 |

*Primary Examiner*—Leo H. Boudreau
*Assistant Examiner*—Brian P. Werner

[57] ABSTRACT

The present invention provides a method for reducing the variations attendant to free-form execution of a signature by providing a delimiting area in which a signature string, and/or portions of a signature string, is/are to be constrainedly transcribed. Also disclosed is a method of signature verification based on analysis of the environs attendant to the signature-string. Such method comprises analyzing the delimited areas attendant to one or more exemplar signatures; determining highly correlative relationships between two or more delimited areas within the signature strings of the exemplar library thereby identifying archetypical delimited areas; causing an unauthenticated signature to be signed in a delimiting manner corresponding to the manner in which the exemplar signatures were delimitedly signed; searching for delimited areas in the unauthenticated signature corresponding to the archetypical delimited areas; determining whether such corresponding archetypical delimited areas of the unauthenticated signature display the same inter-relationships as the archetypical delimited areas with respect to the exemplar signatures; and rejecting as non-authenticate unauthenticated signatures having little correspondence to the exemplar signatures with respect to such highly correlative delimited areas and the relationship there-between.

10 Claims, 9 Drawing Sheets

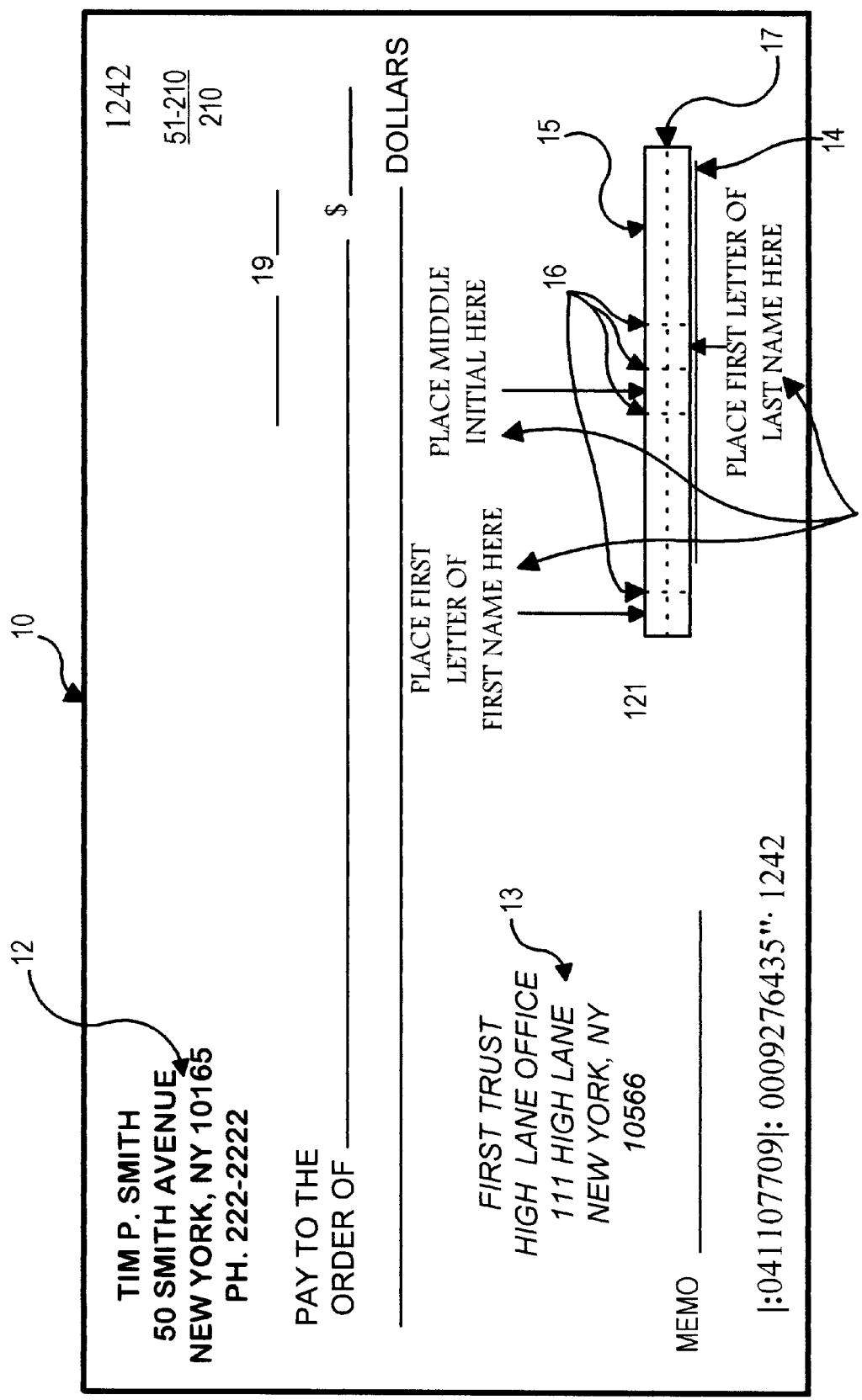

METHOD AND APPARATUS FOR DETECTING FORGED SIGNATURES

RELATED APPLICATION

This is a continuation-in-part of application Ser. No. 08/599,397, now abandoned, filed Jan. 2, 1996.

BACKGROUND OF THE INVENTION

1. Field of Invention

The present invention relates generally to a apparatus and method for detecting forged signatures on a check or draft.

2. Brief Description of Prior Art

Under principles set forth in the Uniform Commercial Code, financial institutions, such as banks and credit unions, are responsible for insuring that checks are validly authorized by the person to whom the drafts were originally issued. Payment on a forged draft results not in the debit of the account of the person to whom the drafts were issued, but rather of the account of the financial institution which honored the forged draft. If a forged draft is detected, the retail or service business that accepted the draft bears the brunt o r the loss.

Losses to financial institutions, and to retail and service businesses, resulting from forged drafts have a significant impact upon the consumer in terms of higher bank fees and higher retail/service prices. Until recently, the only method available to protect against forged signatures was to rely on manual signature checks to determine whether the signature on a draft was valid.

Manual signature checks suffer from many disadvantages, especially with respect to the time involved in conducting such checks. In a financial institution setting, a manual signature check generally entails the bank teller locating the signature card of the transactor from a compilation of thousands of cards and visibly comparing the signature on the card against that on the draft. Such comparison has traditionally only been made on high value single transaction drafts. In a retail or service sector setting, such comparison is generally made by obtaining a signed identity instrument from the consumer, such as a credit card, license etc., and comparing the signature thereon with that which is inscribed on the draft which has been tendered. Management approval is often sought prior to approval. Such attempts to reduce bad-draft losses often result in customer dissatisfaction due to inconvenience, delays, and embarrassment.

Because of the difficulties involved in manual comparisons, computer-assisted methods for ascertaining the validity of a signature have been introduced over the past 20 years. There are two basic approaches to computer-assisted handwriting identification: (1) comparison systems and methods whereby a stored reference signature and a specimen signature are displayed together to allow the validity of the specimen to be judged by the observer and (2) automatic signature verification systems and methods which process data from a reference signature and a specimen signature, and report whether or not the specimen is verified.

Many financial institutions today employ computer-assisted comparison systems and methods for verifying signatures, for example, the check imaging system of SQN. This choice over automated systems and methods is likely due to the high degree of dissatisfaction and failure rate which have accompanied prior automated signature verification systems. Typically, computer-assisted comparison systems provide a plurality of stored reference signatures on a screen against which the signature on a draft may be compared. The draft signature may be feed into the computer for visual comparison of "overlap" with the stored signatures. Systems such as described in U.S. Pat. No. 5,347,589 to Meeks provide reference signatures along with one or more dynamic handwriting parameters represented thereon to allow better visual comparison of the presented signature with the reference signature.

Automated verification methods and apparatuses can be broadly classified into two classes: (1) those involving verification of a signature at point-of-purchase, or "dynamic" verification and (2) those involving verification of a previously executed draft, or "static" verification.

Numerous patents have issued with respect to dynamic point-of-purchase verification systems. Such systems take into account variations in such unique handwriting parameters as applied pressures, or combination of applied pressures, direction and timing of movement of a stylus during the act of handwriting. By measuring and storing information with respect to the same in a database, point-of-purchase systems permit comparison of signatures written at the time of purchase with the database-stored information. U.S. Pat. Nos. 3,480,911, 3,563,097, 3,906,444, 3,956,734, 4,008,457, 4,040,010, 4,040,011, 4,040,012, 4,495,644, 4,553,258, 4,581,482, 4,789,934, 4,111,052, 4,128,829, 4,131,880, 4,308,522, 4,701,960, 4,856,077, 5,054,088, 5,109,426, 5,226,091, 5,422,959, and 5,434,928 all teach special apparatuses whereby the dynamic variations inherent in writing may be converted into electrical signals for analysis. Each requires the writer to use a special pen device to produce the handwriting specimen. None is capable of examining a signed document directly.

Automated static signature verification systems were first proposed as early as the late 1960s, albeit, significant commercial acceptability has yet to surface. Early systems relied essentially on character recognition and pattern superposition types of analysis methods based on x-y positional data. Such systems apparently failed owing to the inherent variability of such positional information. Later systems searching for more exacting methods of verification have employed digital imaging processing technology.

For example, U.S. Pat. No. 4,454,610 discloses a static system, comprised of an encoding and verification device, for classifying and identifying patterns which may be used to verify signatures. A submitted signature is imaged by a lens system to produce two optical images, each of the images are optically transformed, optically averaged and then converted into electrical signals by vidicon tubes. The signals are combined in such a way that the resultant set of signals is the Fourier transform of the transmitted signature. The logarithm of the resultant signals is taken and this final transform is displayed on a screen. A set of fixed detectors measure the intensity values of particular pixels on the screen and this set of values is used to classify/identify the submitted signature.

U.S. Pat. No. 4,985,928 describes a static signature verification system in which optical density measurements of a plurality of elements in a handwriting specimen are made. Density measurements which form continuous line segments of at least a predetermined length, and the location of the same, along the sample are recorded and processed and compared to a reference specimen. The signature is converted to a set of vectors which contain the average density reading across the width of the signature line and the X and Y coordinates of the center of the line. The vector points may be organized as a sequential set of points to permit the flagging of end and crossing points. A five-point smoothing algorithm is used to average out any minuscule imperfections ascertained in the signature thus accomplishing the averaging of two points on both sides of a point to perceive the density at the point being averaged so that both density and X and Y position may be read.

U.S. Pat. No. 5,257,320 describes a static signature verification system employing light analysis to produce component digital representations. A predetermined area on a carrier medium is illuminated and the light reflected therefrom converted to an electrical signal which is subsequently converted to black and white pixel representations of the sample signature. The pixel representations are analyzed to determine the number of pixels which satisfy a plurality of pre-selected features of the sample signature. The resultant determination is compared against that discerned from a plurality of reference signatures.

And further, U.S. Pat. No. 5,251,265 discloses a static signature verification system wherein the image of a signature is aligned with respect to a given axis and is then digitized such that there is provided a grey scale representation of each pixel. Several parameters are measured from the grey scale representations, including the center of gravity of the pixels within each row and column of the representation, a center of gravity line for the centers of gravity for the rows or columns, the center of gravity for all pixels of the image, the positions of maximum grey scale pixels within each row or column, sums of grey scale values per column or row and the shape of a bow within the signature image. Second order polynomials which describe unique segments of the signature are also determined. Such measurements are contrasted against the same measurements made on a plurality of reference signatures, and verification made on the basis of the correlation between the same.

A significant problem associated with static signature verification systems of the past was the need to determine a set of algorithms which were to apply to all sample signatures which were to be analyzed by the system. Extremely reliable algorithms have been found to be elusive, the latter being attributed to the wide-ranging variations which exist with respect to the manner in which individuals write their signatures. Recognition of this problem resulted in several groups proposing "neural network" software techniques, patterned after the striate cortex of a human being, for the computer to generate individualized signature algorithms with respect to a particular person's signature. Neural network software techniques for pattern recognition are described in U.S. Pat. No. 5,251,269.

Application of neural network technology has recently resulted in the commercial introduction of a static electronic signature verification system known as Chequematch®, a product marketed by AEA Technology, a commercial division of the United Kingdom Atomic Energy Authority. Neural network software permits systems such as Chequematch to learn the unique characteristics of a signature from a plurality of reference signatures input into the system. The "learning" process is said to permit these systems to generate algorithms that more appropriately define the writing characteristics of the individual than prior systems.

A significant problem associated with all static verification systems, including neural network-based verification systems, is the complex manner in which they attempt to deal with or adapt to the variabilities inherent in signature-string calligraphy including the changing variables of penmanship and alterations of the habits of the signer. Penmanship variability relates to changes such as the particular type of instrument being used to sign the signature, the length of the signature line on the document (e.g., a signature fitted onto a small line may look substantially different from a signature fitted onto a large line), the position where the signer begins and ends the signature string, how the hand of the signer is positioned on the document being signed (such positioning can dramatically affect the slope nature of the signature particularly if the hand is repositioned midway in the signing process) and the type of substrate upon which the signature is made (e.g., one's signature on a piece of corrugated cardboard may look substantially different than one's signature on a piece of plain paper). Variability in signer habits is due to a multiplicity of factors including, illness or injuries (e.g., when ill, people frequently write smaller), the emotional state of the signer (e.g., the signature of a depressed person often shows a reduction in the size of letter extensions and crosses), and even simple things like the weather (e.g. one often signs things quicker, and thus in a less neat way, when trying to get out of the cold or rain). Changes in one's signature are particularly magnified when one looks at the signature of the same individual over a life time. Few adults continue to sign their name the same way they did when they were six or seven years of age. Similarly, the signature of an elderly person not infrequently significantly differs from the signature of the same individual when they were middle-aged. A signature algorithm may be inadequate for distinguishing authentic from invalid signatures even if it is based upon a plurality of exemplar signatures if such exemplar signatures were supplied on the same day, or in temporal proximity to one another.

Present day static verification systems, further suffer from the inherent complexity of the verification process. Determination of slope functions, pixel contrast, x-y coordinate positions of signature components, center of gravity measurements, the utilization of "smoothing" algorithms, require in-depth analysis of the entire signature string and comparison of these characteristics to the same characteristics, and associated variability of characteristics, determined from analysis of authenticate signature exemplars. As discussed supra, these systems often entail construction of complex algorithms based on a limited sample of authenticate signatures supplied by the person for whom signature comparison is sought. The complexity of the algorithms may lead to many false negatives occurring with respect to truly valid signatures, and in some cases may slow processing of signed documents to an unacceptable rate.

Therefore, there is a need for a static verification system employing a less complex verification protocol which takes into account the variable nature of a person's signing habits, which provides for reducing false negative rejections of authenticate signatures, that is minimally affected by the writing instrument used by the person signing the document, by the document stock and by the length of the signature line on the document to be signed, which is relatively unaffected by the manner in which the signer holds the writing instrument and begins/ends the signature, and yet permits efficient rejection of forged signatures.

OBJECTS AND SUMMARY OF PRESENT INVENTION

The present invention provides a method for reducing the variations attendant to free-form execution of a signature by providing a delimiting area in which a signature string, and/or portions of a signature string, is/are to be constrainedly transcribed. Such delimited signature is verified by comparing certain calligraphic characteristics of the delimited signature string, and/or spatial characteristics of the environs of the signature string, with such characteristics, and associated standard errors, ascertained from analysis of one or more exemplar signatures, preferably two or more exemplar signatures, more preferably three or more exemplar signatures, and preferably originally transcribed in a similar delimited manner.

Heretofore, variability inherent in signature-string calligraphy has been dealt with by developing complex algorithms to adjudge a signature with respect to a multitude of parametric means and standard errors. Such techniques concentrate on dealing with the variability inherent in free-form signature-string calligraphy rather than in attempting to reduce these variabilities. The present invention reduces such variabilities by constraining the signature, and parts thereof, to certain delimited areas. It has been found that such constraints significantly improve uniformity between signatures obtained from individuals over a period of time. Constrained signatures may be used in many of the presently known signature verification systems. Preferably the constrained signature on the document to be verified, such as a check, note etc., is compared against one or more exemplar signatures transcribed by the authorized transactor in a similarly delimited framework, that is, constrained in a similar manner.

The present invention discloses a method for improving with respect to an individual, signature string uniformity within a plurality of signature strings, and for reducing variations attendant to execution of a signature string, comprising: (a) delimiting the area in which the signature string is to be placed; (b) delimiting portions of the delimited signature area; (c) instructing the individual to place certain portions of the signature string in the delimiting portions of the delimited signature string area. Preferably two or more characters, but less than all of the characters comprising a signature string are to be transcribed within character delimitations. More preferably three or more characters, but less than all of the characters comprising a signature string, are to be transcribed within character delimitations. In a preferred embodiment an individual is instructed to place only the first letter of the individual's first name, the first letter of the individual's middle name, and the first letter of the individual's last name in character delimited areas (i.e., three chamber delimited areas). The area in which the signature string is to be placed is also preferably delimited.

In a particularly preferred embodiment, a method for improving with respect to an individual, signature string uniformity within a plurality of signature strings, and for reducing variations attendant to execution of a signature string, for use of such signature strings in automated signature verification systems is disclosed, comprising the steps of: delimiting the area in which the signature string is to be placed; delimiting within the delimited signature string area the area in which two or more characters, but less than all the characters, comprising the signature string are to be constrainedly written, thereby forming delimited character areas; instructing an individual to place the signature string in the delimited signature string area and the two or more characters of the signature string in the delimited character areas of the delimited signature string area; and comparing by automated means the resulting contrained signature against one or more authenticated signatures of an individual.

Also disclosed is a method of signature verification based on analysis of the environs attendant to the signature-string. It has been found that trans-positional relationships between certain areas confined within the signature string itself, and certain contiguous areas, or positionally-defined contiguous areas (that is, areas delimited at least along one axis by an arbitrary choice of one or more points rather than an actual delimitation), formed between the signature string and a delimitation means, may be used to verify a written signature. It is theorized that the high correlation of these relationships to a particular individual is due in whole, or in part, to unique spatial-cognitive thought patterns and behaviors which are developed from infancy through childhood, which may account for a higher correlation being found in older children and adults.

Preferably environs analysis makes use of constrained signatures and measures the space encompassed by and/or de-bounded about the signature string, and/or between the signature string, or portion thereof, and a signature-delimiting boundary. Signature verification may entail integral, fractal or euclidian geometric analysis of the space, and may involve any type of correlative area analysis including analysis with respect to shape configuration, geometrical perimeter, fractal dimension, or planar area.

The signature verification method of the present invention comprises: analyzing the delimited areas attendant to one or more exemplar signatures; determining highly correlative relationships between two or more delimited areas within the signature strings of the exemplar library thereby identifying archetypical delimited areas; causing an unauthenticated signature to be signed in a delimiting manner corresponding to the manner in which the exemplar signatures were delimitedly signed; searching for delimited areas in the unauthenticated signature corresponding to the archetypical delimited areas; determining whether such corresponding archetypical delimited areas of the unauthenticated signature display the same inter-relationships as the archetypical delimited areas with respect to the exemplar signatures; and rejecting as non-authenticate unauthenticated signatures having little correspondence to the exemplar signatures with respect to such highly correlative delimited areas and the relationship there-between. Archetypical delimited areas may include nearly any area bounded by or residing between any portion of the signature string, or between the signature string and a delimiting area (for example, the areas formed within closed letters such as an "a" and "g", or areas between two letters, etc.). Archetypical areas are determined by analyzing a plurality of signatures made by a single person and determining which areas or combination of areas remain relatively constant between exemplar signatures with respect to a derived algorithm (e.g., a person may always make his "o"s smaller than his "a"s in such a manner that the ratio of the enclosed areas is always approximately 1.2). Archetypical areas may differ between different portions of a signature string (for example, a person may always make his "o"s smaller than his "a"s in his first name but not in his last name).

A further aspect of the present invention is a signature verification method comprising: (a) obtaining one or more exemplar signatures constrained by one or more delimitations; (b) analyzing the delimited areas attendant to the exemplar signature; (c) determining highly correlative relationships between two or more delimited geometrical areas of the signature exemplars thereby identifying archetypical delimited areas; (d) causing an unauthenticated signature to be signed in a delimiting manner corresponding to the manner in which the exemplar signatures were delimitedly signed; (e) searching for delimited areas in the unauthenticated signature corresponding to the archetypical delimited areas; (f) determining whether the corresponding archetypical delimited areas of the unauthenticated signature display the same inter-relationships as said archetypical delimited areas with respect to the exemplar signatures; and (g) rejecting as non-authenticate unauthenticated signatures having little correspondence to the exemplar signatures with respect to the highly correlative delimited areas.

By "delimited geometrical area" it is meant an area comprising contiguous pixels found between actual delimitations, such as between two portions of the signature string and/or between a portion of the signature string and a tangible delimitation existing on the substrate on which such signature string is transcribed, and/or areas defined in whole or part by artificial delimitations, such as when a delimitation is set by algorithm means. With respect to areas said to be "highly correlative" among signature strings comprising an exemplar library of authenticated signature strings, it is meant that a mathematical relationship is determined between two or more delimited areas within an individual signature string which holds for more than 70% of the other signatures comprising the exemplar library. More preferably such mathematical relationship may be required to hold for more than 80% of such signatures, yet more preferably more than 90% of such signatures, yet more preferably more than 95% of such signatures, yet more preferably more than 99% of such signatures, and yet most preferably all of the signatures comprising the exemplar library. By "little correspondence" between highly correlative delimited areas of two or more signatures, it is meant that there is less than an eighty percent probability that such delimited area relationships are the same. Of course, correspondence levels may be set at lower probability levels, such as 50%, 60%, 70%, or higher levels, such as 90%, 95%, 99%, 100%. By "corresponding area" it is meant that the area relates to another area in being found between the same delimitations, whether actual or artificially imposed. For example, given the signature string "Tom Andy" the area encompassed by the letter "o" in the first name of an exemplar "Tom Andy" signature string "corresponds" to the area encompassed by the letter "o" in the first name of an unauthenticated "Tom Andy" signature string, while the area under the letter "n" in the last name of an exemplar "Tom Andy" signature string "corresponds" to the area under the letter "n" in the last name of an unauthenticated "Tom Andy" signature string.

A preferred signature verification method comprises: obtaining one or more exemplar signature strings, and preferably two or more exemplar signature strings, and more preferably three or more exemplar signatures, from an individual whose identity is verified to form an exemplar library; analyzing for each exemplar signature in the exemplar signature in the exemplar library the characteristics of the geometrical areas bounded by the exemplar signature string itself, residing between portions of the exemplar signature string and/or residing between the signature string and any signature string delimitation placed similarly in each of said exemplar signatures; determining the geometrical areas which are correspondingly found in each of the exemplar signatures of the exemplar library; determining a mathematical relationship between two or more, and preferably between three or more, and more preferably four or more, of such geometrical areas in an exemplar signature that holds for more than 70% of the other signatures comprising the exemplar library, more preferably holding for more than 80% of such signatures, yet more preferably more than 90% of such signatures, yet more preferably more than 95% of such signatures, and yet more preferably more than 99% of such signatures, and yet most preferably all of the exemplar signatures in the exemplar library, thereby identifying archetypical delimited areas; obtaining one or more signature strings which are to be authenticated; searching for archetypical delimited areas in the one or more signature strings to be authenticated; determining whether archetypical delimited areas of the one or more unauthenticated signatures display the same mathematical relationship as the corresponding archetypical delimited areas with respect the exemplar signatures; and rejecting as non-authenticate unauthenticated signatures failing to display the same mathematical relationship as the archetypical delimited areas with respect to the exemplar signatures. In one embodiment of the present invention the mathematical relationship between the geometrical areas relates to the interrelationship between surface area. In another embodiment the interrelationship between delimited geometrical areas relates to the interrelationship between geometrical perimeters.

And yet another embodiment of the signature verification method of the present invention comprises: obtaining one or more exemplar signatures, more preferably two or more exemplar signatures, and more preferably three or more exemplar signatures, constrained by one or more delimitations; analyzing the characteristics of the delimited geometrical areas comprising the environs of the exemplar signatures; determining highly correlative relationships between two or more delimited geometrical areas found in each signature exemplar thereby identifying archetypical delimited areas; causing an unauthenticated signature to be signed in a delimiting manner corresponding to the manner in which the exemplar signatures were delimitedly signed; searching the unauthenticated signature for delimited areas corresponding to the archetypical delimited areas; determining whether the corresponding archetypical delimited areas of the unauthenticated signatures display the same interrelationships as the archetypical delimited areas found within the exemplar signatures; and rejecting as non-authenticate unauthenticated signatures having little correspondence to the exemplar signatures with respect to the archetypical delimited areas.

And yet disclosed is another embodiment of the signature verification method of the present invention comprising: obtaining from an individual whose identity has been verified one or more exemplar signatures, more preferably two or more exemplar signatures, constrained by one or more, preferably two or more, more preferably three or more, delimitations to form an exemplar library; analyzing for each exemplar signature in the exemplar library the characteristics of geometrical areas bounded by the exemplar signature string itself, residing between portions of the exemplar signature string and/or residing between the exemplar signature string and the one or more delimitations; determining the geometrical areas which are correspondingly found in each of the exemplar signatures of the exemplar library; determining a mathematical relationship between one or more, preferably two or more, more preferably three or more, of the geometrical areas found in each of the exemplar signatures that holds for each of the exemplar signatures in the exemplar library, thereby identifying archetypical delimited areas; causing one or more unauthenticated signatures to be signed in a delimiting manner corresponding to the manner in which the exemplar signatures were delimitedly signed; searching for the archetypical delimited areas in the one or more unauthenticated signatures; determining whether the corresponding archetypical delimited areas of the one or more unauthenticated signatures display the same mathematical relationship as the archetypical delimited areas of the exemplar signatures; and rejecting as non-authenticate unauthenticated signatures failing to display the same mathematical relationship as the archetypical delimited areas of the exemplar signatures.

In a preferred method the authenticated signature is generated in a similarly constrained manner as the exemplar signatures. By "similarly constrained" it is meant that the signature is constrained in substantially the same manner. By "constraining in substantially the same manner" it is meant that the constraints, comprising delimitations or otherwise (as, for example, instructions), dictate transcription of a character or signature string, or portion thereof, in such a manner that an average individual complying with such constraints would transcribe such characters and/or signature string, or portion thereof, which are subject to the constraints, in a manner such that there would be more than an 80% correlation in one or more aspsects between such transcribed characters and/or signature string, or portion thereof among a plurality of signatures.

A further embodiment of the signature verification verification method of the present invention comprises: (a) obtaining from an individual whose identity has been verified one or more exemplar signatures, preferably two or more, constrained by one or more, preferably two or more, more preferably three or more, delimitations to form an exemplar library; (b) generating a set of geometric areas based on a first type of geometric analysis for each exemplar signature in the exemplar library comprising areas of contiguous pixels enclosed by the exemplar signature string itself, residing between portions of the exemplar signature string itself, residing between the exemplar signature string and/or residing between the exemplar signature string, and the one or more delimitations; (c) determining the geometrical areas which are correspondingly found in each of the exemplar signatures of the exemplar library; (d) determining a mathematical relationship indicating a correspondence between two or more, and preferably between three or more, and more preferably four or more, of such geometrical areas found in each of the exemplar signatures that holds for the corresponding geometric areas in more than 70% of the other signatures comprising the exemplar library, more preferably holding for more than 80% of such signatures, yet more preferably more than 90% of such signatures, yet more preferably more than 95% of such signatures, and yet more preferably more than 99% of such signatures, and yet most preferably all of the exemplar signatures in the exemplar library, thereby identifying archetypical delimited areas; (e) repeating steps b–d using a second type of geometric analysis to generate a second set of geometric areas to optimize the number of archetypical areas for a particular individual, and identifying optimized archetypical delimited areas; (f) causing one or more unauthenticated signatures to be signed in a delimiting manner corresponding to the manner in which the exemplar signatures were delimitedly signed; (g) searching for the optimized archetypical delimited areas in the one or more unauthenticated signatures; (h) determining whether the corresponding optimized archetypical delimited areas of the one or more unauthenticated signatures display the same mathematical relationship as the optimized archetypical delimited areas of the exemplar signatures; and (i) rejecting as non-authenticate unauthenticated signatures failing to display the same mathematical relationship as the optimized archetypical delimited areas of the exemplar signatures. In a preferred method the authenticated signature is generated in a similarly constrained manner as the exemplar signatures.

And yet a further embodiment of the signature verification method comprises: (a) obtaining one or more exemplar signature strings, and preferably two or more exemplar signature strings, and more preferably three or more exemplar signatures, from an individual whose identity is verified to form an exemplar library; (b) generating a set of geometric areas, based on a first type of geometric analysis, for each exemplar signature in the exemplar signature in the exemplar comprising areas of contiguous pixels enclosed by the exemplar signature string itself, residing between portions of the exemplar signature string and/or residing between the signature string and any signature string delimitation placed similarly in each of said exemplar signatures; (c) determining the geometrical areas which are correspondingly found in each of the exemplar signatures of the exemplar library; (d) determining a mathematical relationship indicating a correspondence between two or more, and preferably between three or more, and more preferably four or more, of such geometrical areas found in each of the exemplar signatures that holds for the corresponding geometric areas in more than 70% of the other signatures comprising the exemplar library, more preferably holding for more than 80% of such signatures, yet more preferably more than 90% of such signatures, yet more preferably more than 95% of such signatures, and yet more preferably more than 99% of such signatures, and yet most preferably all of the exemplar signatures in the exemplar library, thereby identifying archetypical delimited areas; (e) repeating steps b–d using a second type of geometric analysis to generate a second set of geometric areas to optimize the number of archetypical areas for a particular individual, and identifying optimized archetypical delimited areas; (f) obtaining one or more signature strings which are to be authenticated; (g) searching for the optimized archetypical delimited areas in the one or more signature strings to be authenticated; (h) determining whether corresponding optimized archetypical delimited areas of the one or more unauthenticated signatures display the same mathematical relationship as the optimized archetypical delimited areas with respect the exemplar signatures; and (i) rejecting as non-authenticate unauthenticated signatures failing to display the same mathematical relationship as the archetypical delimited areas with respect to the exemplar signatures. In a preferred embodiment of the present invention the mathematical relationship between the geometrical areas relates to the interrelationship between surface area. In another preferred embodiment the interrelationship between delimited geometrical areas relates to the interrelationship between geometrical perimeters.

And yet a further aspect of the present invention is directed to a computer-assisted system for assuring the authenticity of a signature made on a solid-support medium comprising: a data storage system for storing digitized data with respect to the environs of one or more exemplar signature strings; a data processing system for digitizing information pertaining to the environs of an unauthenticated signature string; a processor for comparing the digitized data with respect to the environs of the exemplar signature strings and said unauthenticated signature string.

Analysis of the environs attendant to the signature string may be by means of an electronic scanning device, such as that disclosed herein, programmed to recognize as area partitions both the signature-delimiting boundaries, and the signature string itself and programmed to include in any particular area determination contiguous pixels uninterrupted by any area partition. Such signature scanning apparatus is electronically coupled to a data processing device having access to a library database of stored exemplar signatures, or measurements pertaining to a library of exemplar signature. It is contemplated hereby that an exemplar signature may be stored within a data storage unit coupled to a microchip, which may be integrated into a portable card, such as found in SmartCard® which may be provided to an entity seeking to validate an signature by the methods disclosed herein. Such microchip containing card may also be used to provide the unauthenticated signature for analysis against an authenticated signature stored in another data base. The presently disclosed system permits ascertainment of forged signatures placed on paper and other solid-support media, such as plastic and metal, thereby liberating financial personnel and retailers from manually comparing signatures to detect forgeries.

BRIEF DESCRIPTION OF DRAWINGS

For a more complete understanding of the objects of the present invention, the Detailed Description of the Illustrative Embodiments thereof is to be taken in connection with the following drawings, in which:

FIGS. 1a and 1b are schematics of a check designed to facilitate signature recognition.

DETAILED DESCRIPTION OF THE ILLUSTRATIVE EMBODIMENT OF THE PRESENT INVENTION

Figure 1B:
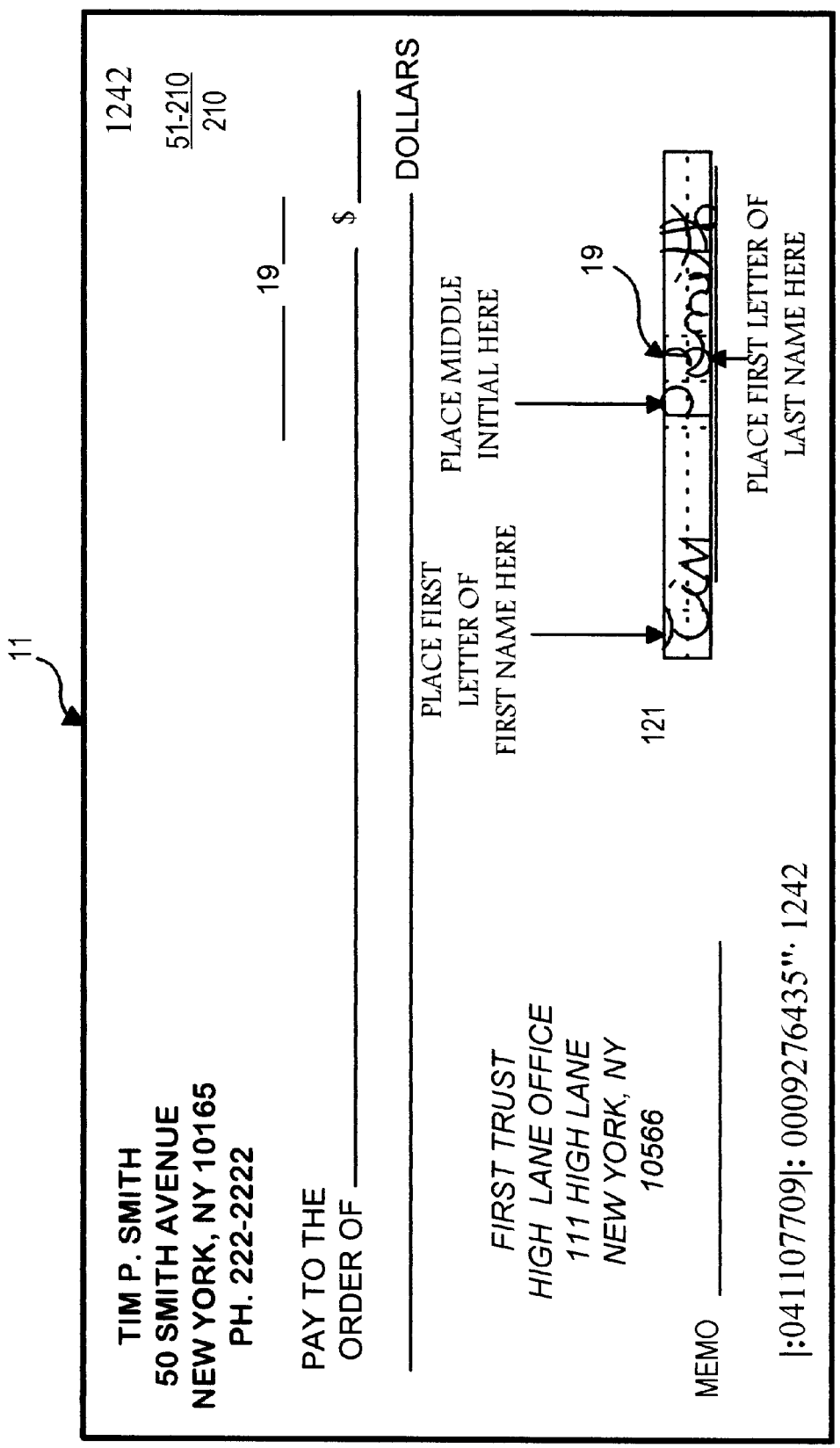

FIG. 1 is a schematic representation of a check designed to facilitate signature recognition. As illustrated, in FIG. 1a unexecuted check 10 comprises a draft issued by an authorizing bank 13 to an authorized individual 12 for transferring funds from the individual's checking account to another. Check 10 of the present invention further comprises on or about standard signature line 14 a delimiting area 15 for constraining the signature string, and parts thereof, to particular boundaries. Delimitation area 15 may house several vertical 16 and horizontal 17 delimitation areas therein. Directions 18 are provided the maker of the check to instruct the maker as to how to constrain the maker's signature string so as to reduce variability found in free-form calligraphy. No direction is shown as to the horizontal delimiting line of the example, as it has been found that many people routinely attempt to keep small letters below the line (probably due to grammar school handwriting training). As seen in FIG. 1b, an executed check 11, with signature executed according to the present invention, will have a constrained signature 19 thereupon.

Figure 2A:
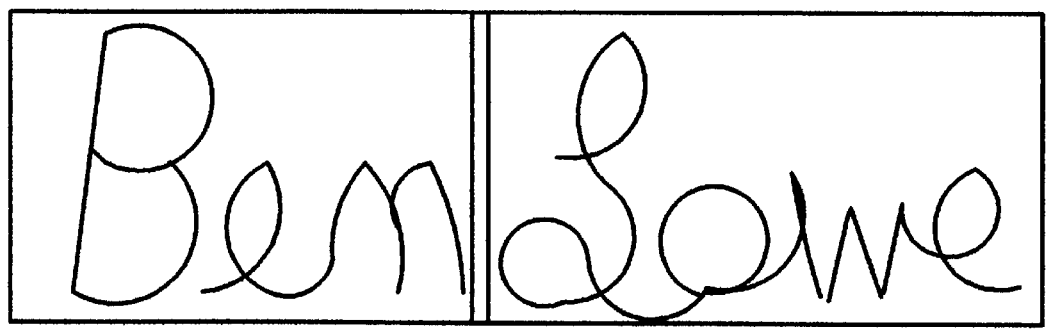
FIGS. 2a and 2b are schematics illustrating the opposing optical contrast manners in which a signature may be viewed.
Figure 2B:
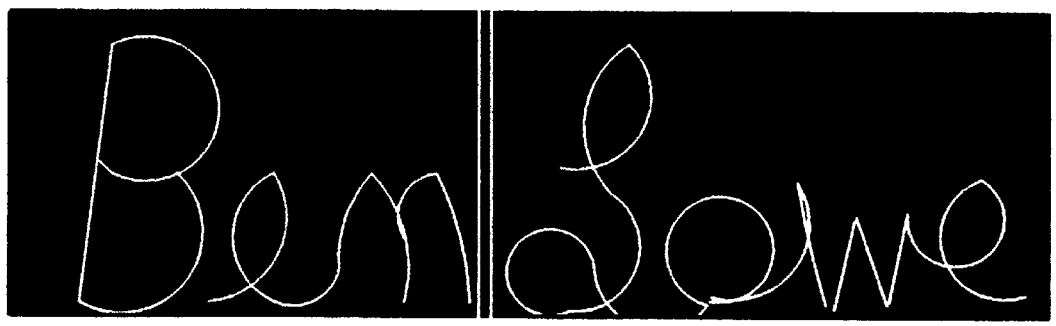

FIG. 2 is a schematic illustrating the opposing optical contrast manners in which a signature may be viewed. As opposed to past signature verification systems which analyze the signature string (black areas of FIG. 2a), the verification embodiment of the present invention analyzes the environs attendant to the signature string (black areas of FIG. 2b).

Figure 3:
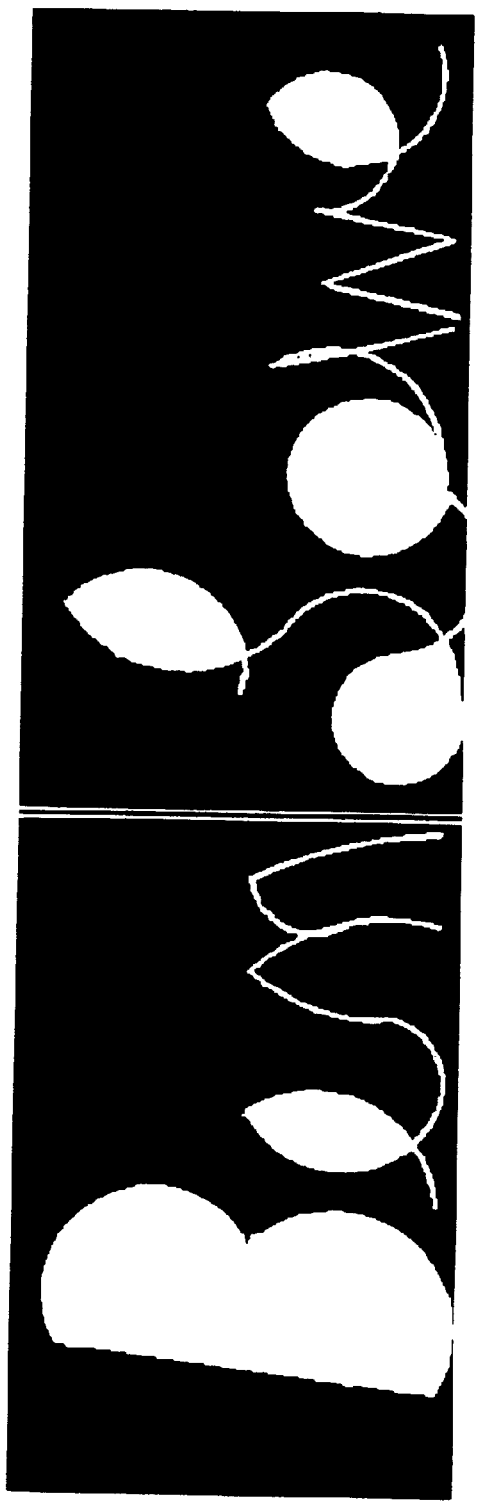
FIGS. 3–5 are schematics depicting alternative manners in which area determinations for use in the disclosed signature verification system may be determined.
Figure 3:
Figure 4:
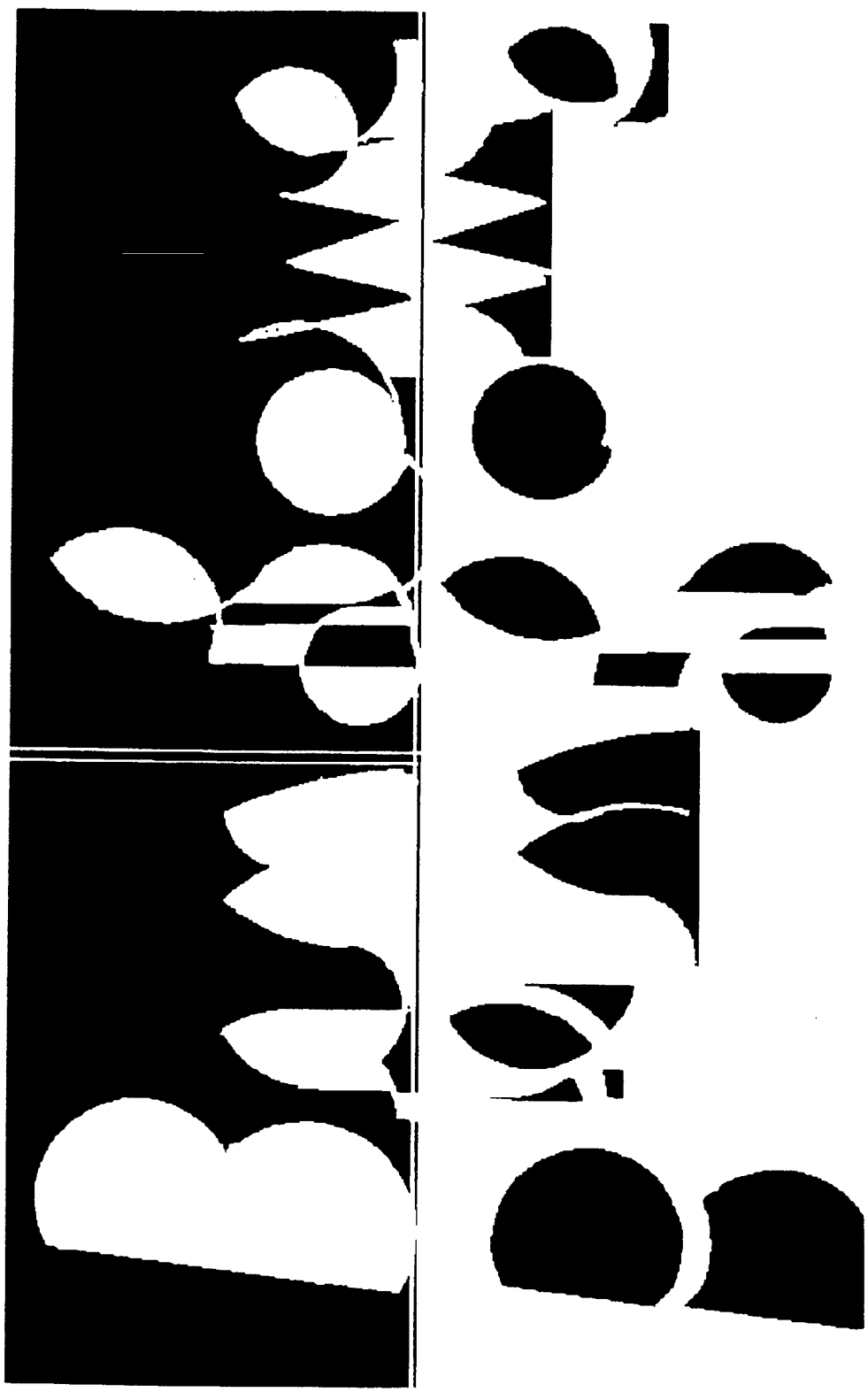
Figure 5:
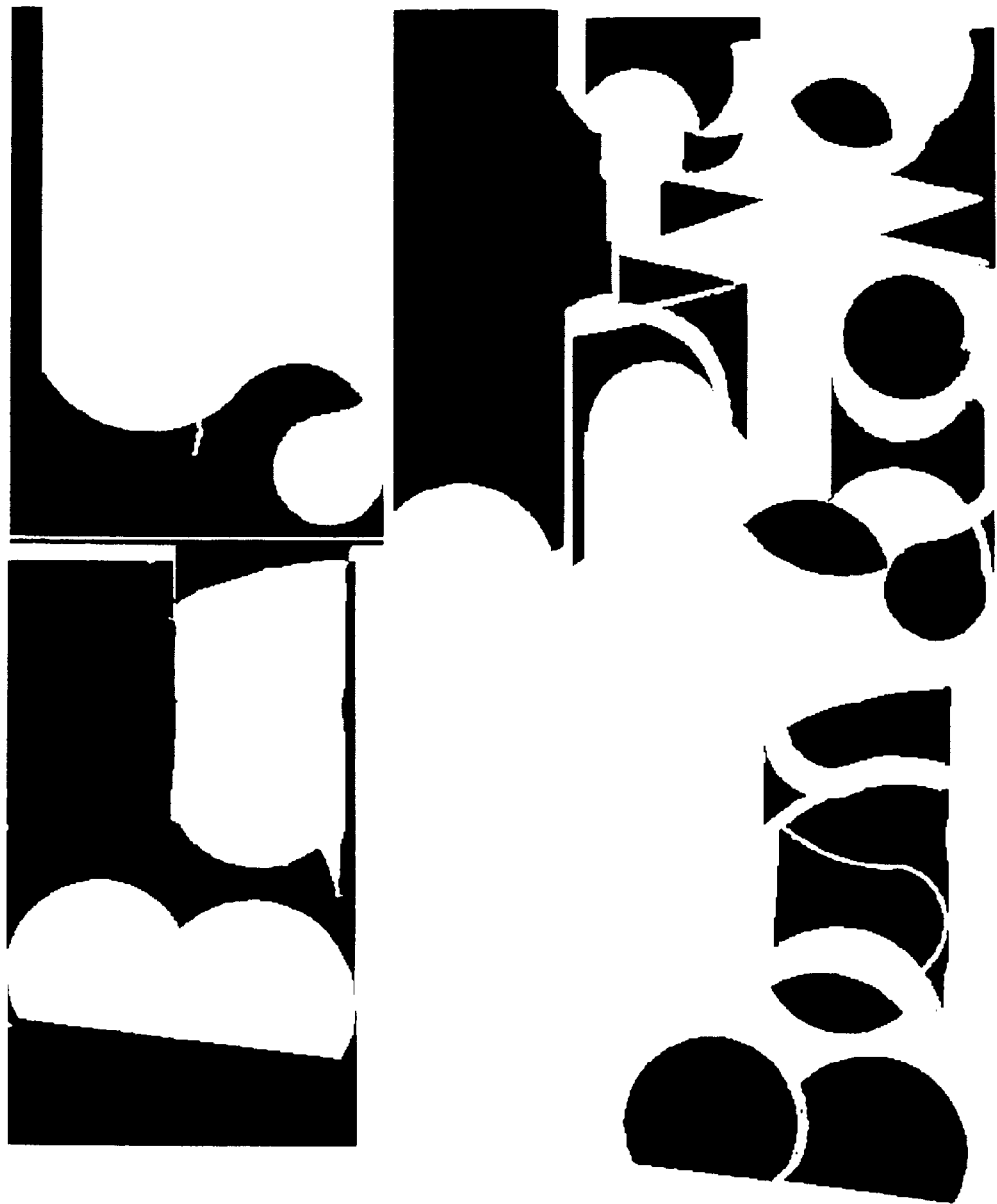

FIGS. 3–5 are schematics depicting some of the many manners in which the environs attendant the signature string may be divided into delimited areas due to delimitation by the signature string itself and the manner of scanning.

FIG. 3 illustrates that a delimited signature string may be viewed as a number of internally delimited areas caused by enclosure of the signature string itself and an external delimited contiguous pixel area(s) comprising the remainder of the environs. Such enclosed pixel areas and the external contiguous pixel area(s) may be determined by coupling an optical scanner to a computer pre-programmed to determine areas of contiguous pixel concentrations. Although not shown, the computer coupled to the optical scanner may be further programmed to delimit contiguous pixel areas at pre-selected x or y gradients along the x or y axis of the signature string, thus generating considerably more delimited areas for comparison purposes. By analyzing a plurality of exemplar signatures, and comparing areas generated by different division gradients, the division gradient which optimizes the number of archetypical delimited areas for a particular persons signature can be determined. In such an embodiment, the unauthenticated signature is subjected to similar gradient analysis.

Figure 8A:
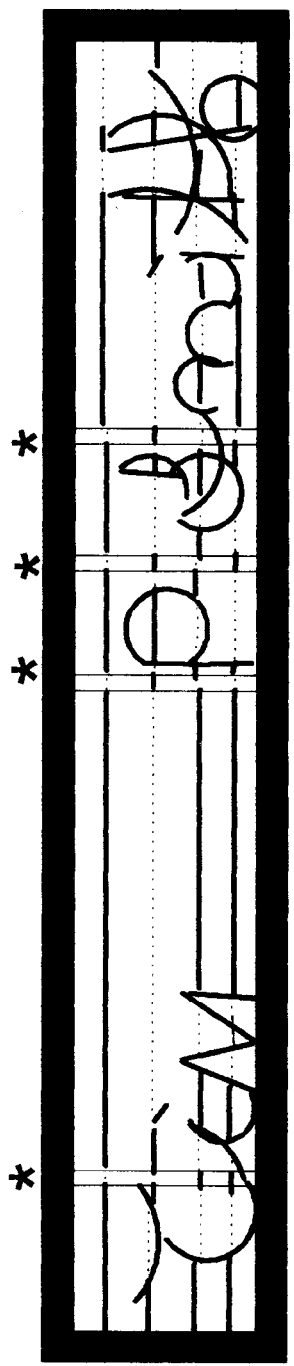
FIGS. 8a and 8b are schematic representations of two alternative scans of a signature to produced area data for use in the signature verification system disclosed.
Figure 8B:
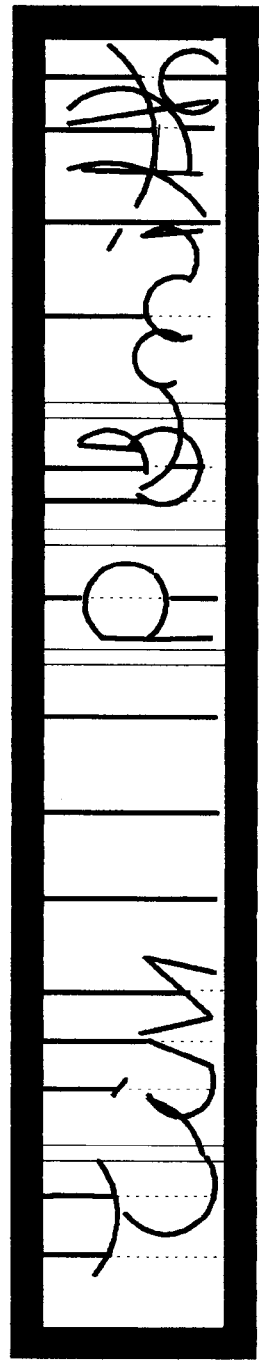

FIGS. 4 and 5 represent delimited areas which might be generated using vertical and horizontal scanning techniques illustrated in FIGS. 8b and 8a respectively. While FIGS. 8b and 8a illustrate only a relatively few scan lines over the entire signature string, it should be understood that typically in practice many more scan lines would be necessary to produce adequate area determinations.

Utilizing a vertical scan procedure as illustrated by the scan lines of FIG. 8b (dotted lines representing scan on, and dark lines representing scan off), a scan similar to that of FIG. 4 may be produced. In such scanning procedure, the scanner would be programmed to begin measurement of a scan line upon interaction with a first portion of the signature string, to terminate scan line measurement upon interaction with a second portion of the signature string, and to begin measurement again when interacting with a third portion of the signature string (turning off upon interaction with a fourth portion, etc.).

Utilizing a horizontal scan procedure as illustrated by the scan lines of FIG. 8a (dotted lines representing scan on, and dark lines representing scan off), a scan similar to that of FIG. 5 may be produced. The scanner may be programmed to begin measurement of a scan line upon interaction with a first delimiting mark or portion of the signature string, to terminate scan line measurement upon interaction with a second delimiting mark or portion of the signature string, and to begin measurement again when interacting with a third delimiting mark or portion of the signature string (turning off upon interaction with a fourth, etc.).

Figure 6:
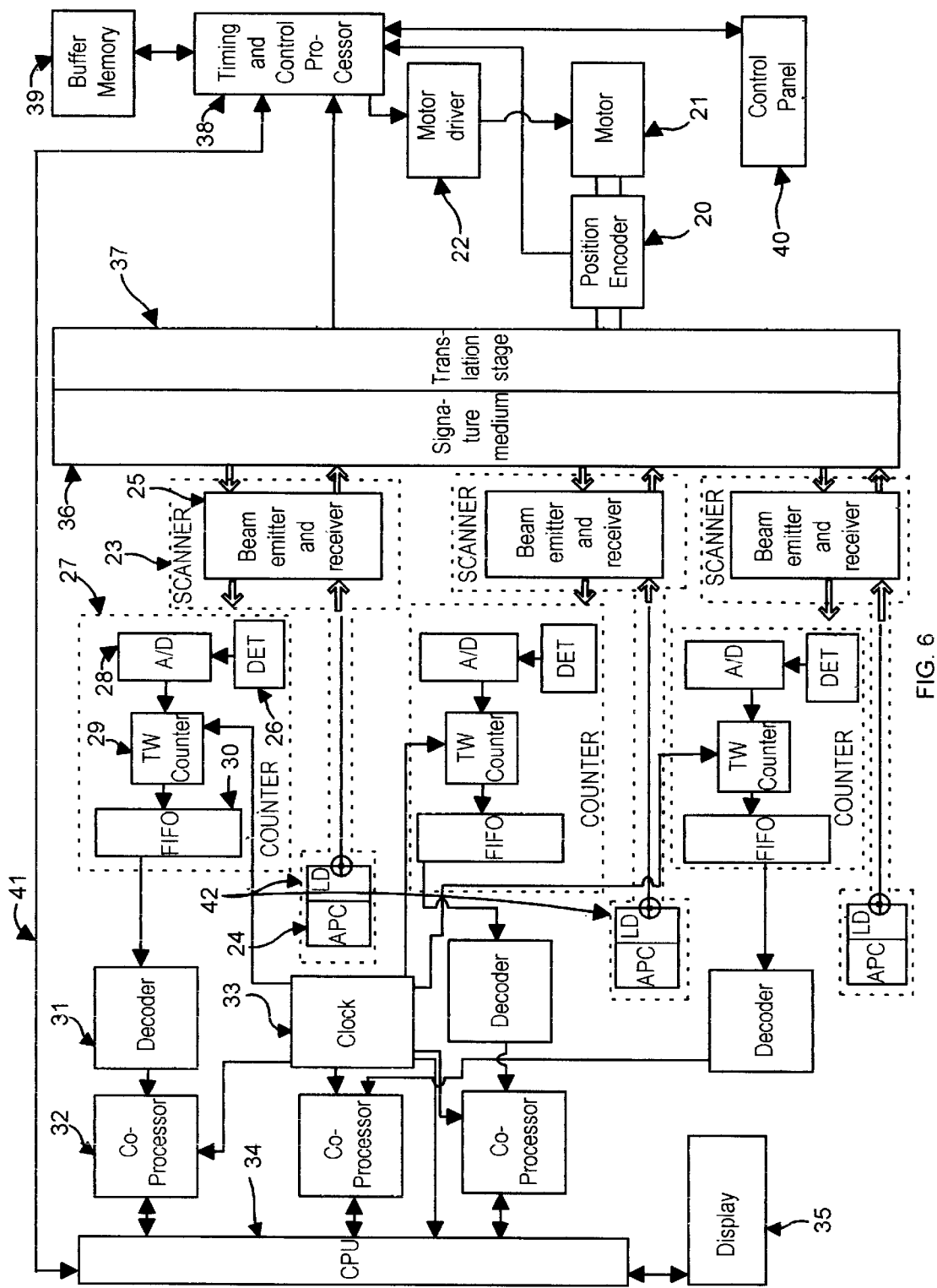
FIG. 6 is a block diagram of a signature scanning device finding application in the disclosed signature verification system.

FIG. 6 is a block diagram of a signature scanning device finding application in the disclosed signature verification system. Translation of the signature medium 36 upon which the signature is written is accomplished by coupling motor 21 through position encoder 20 to translation stage 37 by any of many number of known methods in the art, including a lead screw and nut, and rack and pinion gear. Motor 21 is driven by motor driver 22, which is controlled by timing and control processor 38 having buffer memory 39 in communication with control panel 40. Timing and control processor 38 may receive position information from translation stage 37 by position encoder 20, or the system may operate in open loop fashion as with a stepping motor. Signature medium 36 is translated by one or more laser scanners 42 as found in a conventional bar code reader. Laser scanners 42 comprise scanners 23, having an automatic power controller (APC) 24 for driving a laser diode (LD) so as to make LD radiate constant power of laser, and beam emmiters and receivers 25. Counters 27, which receive input from beam emitters and receivers 25, comprise detectors 26 for detecting reflected light from the signature and producing an electric analog signal. Also shown are analog-to-digital converters 28 which are connected with and receive the analog signal output of detectors 26, time width (TW) counters 29 for counting the time between digital signals corresponding to each successively scanned portion of the signature string using clock signal output by clock signal generators 33, and first-in first-out (FIFO) registers 30 for holding data. The numerical data held in FIFOs 30 is sent to decoders 31 in accordance with a command from co-processors 32. For simplicity, lines for transferring command signals and response signals between co-processors 32 and other units such as FIFOs 30 and decoders 31 are omitted in FIG. 6. Decoders 31 decode numerical data sent to them and analyze the same as to whether any data received from FIFOs 30 exceeds a pre-determined maximum suggestive of false data. Decoders 31 send data to central processing unit 34 which calculates in conjunction with information from timing and control processor 38 the position of each scan line start and end and utilizes input from one or more co-processors 32 to determine archetypical delimited areas in and about the signature string. Central process unit 34 may be coupled to display 35 or other peripherals.

Figure 7A:
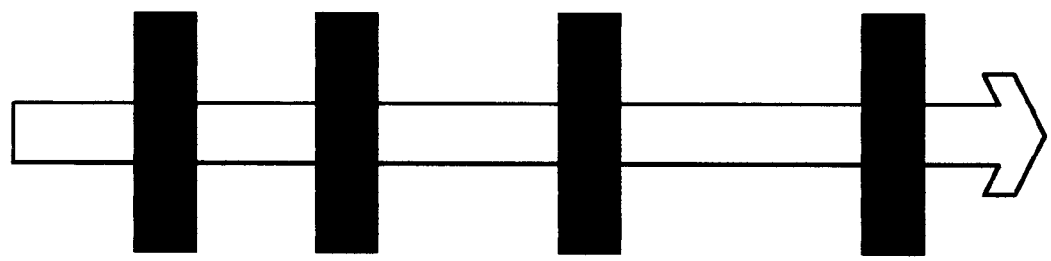
FIG. 7a is illustration of an optical beam scanning black marks on a white background.
Figure 7B:
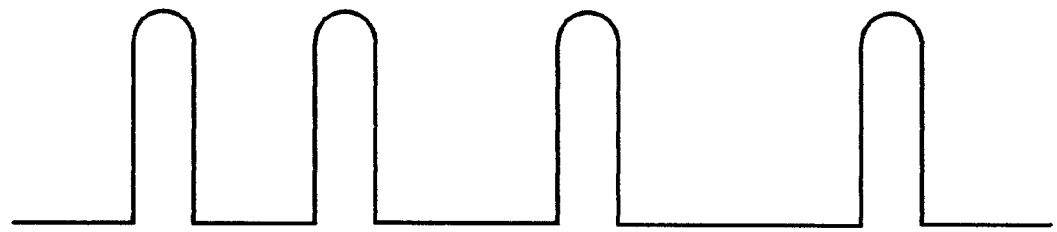
FIG. 7b is the signal waveform of an analog signal output of a mark detector.
Figure 7C:
FIG. 7c is a signal waveform illustrating a digital signal output from an analog-to-digital converter, produced at the trailing edge of each positive level of the waveform shown in FIG. 7b.
Figure 7D:
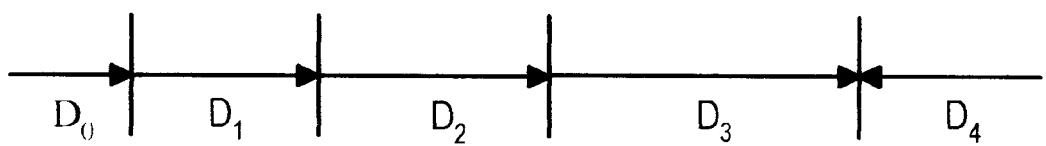
FIG. 7d is a sequence of numerical data produced from the digital signals shown in FIG. 7c.

FIG. 7a is illustration of an optical beam scanning black marks on a white background. FIG. 7b illustrates the signal waveform of an analog signal output of a detector 26 when the beam scans a signature mark. FIG. 7c is a signal waveform illustrating a digital signal output from an analog-to-digital converter, produced at the leading edge of each positive level of the waveform shown in FIG. 7b. As shown in this embodiment, the width of the signature mark is ignored for purposes of determining the area between successive marks. By ignoring the width of the signature mark, the present embodiment overlooks variabilities which may be introduced owing to the type of writing utensil used to make the signature. As illustrated in FIG. 7d, this embodiment differs from standard bar code readers in ignoring the width of the marks thereby including portions of the mark area in determining numerical data with respect to the transverse between portions of the signature string.

While this application has been described in connection with certain specific embodiments thereof, it should be understood that these are by way of example rather than by way of limitation, and it is not intended that the invention be restricted thereby.

What is claimed is:

1. A method for improving with respect to an individual, signature string uniformity within a plurality of signature strings, and for reducing variations attendant to execution of a signature string, for use of such signature strings in automated signature verification systems comprising:

a) delimiting the area in which said signature string is to be placed;
   b) delimiting within said delimited signature string area the areas in which two or more characters, but less than all the characters, comprising the signature string are to be constrainedly written, thereby forming delimited character areas;
   c) instructing an individual to place said signature string in said delimited signature string area and said two or more characters of said signature string in said delimited character areas of said delimited signature string area; and
   d) comparing by automated means the resulting constrained signature against one or more authenticated signatures of an individual.

2. A signature verification method comprising:

a) obtaining two or more exemplar signatures from a verified individual constrained by two or more delimitations to form an exemplar library;
   b) analyzing for each exemplar signature in the exemplar library the characteristics of the geometrical areas bounded by the exemplar signature string itself, residing between portions of the exemplar signature string or residing between the exemplar signature string and said one or more delimitations;
   c) determining said geometrical areas which are correspondingly found in substantially each said exemplar signature of said exemplar library;
   d) determining one or more mathematical relationship(s) between a plurality of corresponding geometrical areas within an exemplar signature that holds true for substantially each of said exemplar signatures in said exemplar library, thereby identifying archetypical delimited areas;
   e) causing one or more unauthenticated signatures to be signed in a delimiting manner corresponding to the manner in which said exemplar signatures were delimitedly signed;
   f) searching for said archetypical delimited areas determined in step d in said one or more unauthenticated signatures;
   g) determining whether said archetypical delimited areas of said one or more unauthenticated signatures display the same mathematical relationship as said archetypical delimited areas with respect to said exemplar signatures; and
   h) rejecting as non-authenticate unauthenticated signatures failing to display the same mathematical relationship(s) as said archetypical delimited areas with respect to said exemplar signatures.

3. The method of claim 2 wherein three or more delimitations are used to constrain the exemplar signatures.

4. The method of claim 2 wherein the signature verification method is used to identify a person from a signature.

5. The signature verification method of claim 2 wherein the geometrical areas generated in step b are based on a first type of geometric analysis, and after step c, undertaking a second type of geometric analysis to generate further sets of geometric areas to optimize the number of corresponding areas for a particular individual, wherein the optimized corresponding areas are used in step d to identify the archetypical delimited areas.

6. A signature verification method comprising:

a) obtaining two or more exemplar signature strings from a verified individual to form an exemplar library;
   b) analyzing for each exemplar signature in the exemplar library the characteristics of the geometrical areas bounded by the exemplar signature string itself, residing between portions of the exemplar signature string or residing between the signature string and any signature string delimitation placed similarly in each of said exemplar signatures;

c) determining said geometrical areas which are correspondingly found in substantially each of said exemplar signatures of the exemplar library;

d) determining one or more mathematical relationship(s) between more than one said corresponding geometrical areas within an exemplar signature that holds true for substantially each of said exemplar signatures in said exemplar library, thereby identifying archetypical delimited areas;

e) obtaining one or more signature strings which are to be authenticated;

f) searching for said archetypical delimited areas in said one or more unauthenticated signatures;

g) determining whether said corresponding archetypical delimited areas of said one or more unauthenticated signatures display the same mathematical relationship(s) as said archetypical delimited areas with respect to said exemplar signatures; and h) rejecting as non-authenticate unauthenticated signatures failing to display the same mathematical relationship as said archetypical delimited areas with respect to said exemplar signatures;

wherein the area encompassed by the perimeter of the entire signature string is not used as a corresponding geometrical area for purposes of determining the mathematical relationship(s) of step d.

7. The method of claim 6 wherein said mathematical relationship(s) between said two or more geometrical areas relates to the interrelationship between surface area.

8. The method of claim 6 wherein the signature verification method is used to identify a person from a signature.

9. A signature verification method comprising the steps of:

a) obtaining two or more exemplar signature strings from a verified individual to form an exemplar library;

b) generating a set of geometric areas based on a first type of geometric analysis for each exemplar signature in the exemplar library comprising areas of contiguous pixels enclosed by the exemplar signature string itself, residing between portions of the exemplar signature string itself, or residing between the exemplar signature string and one or more delimitations;

c) determining said geometrical areas which are correspondingly found in substantially each of said exemplar signatures of the exemplar library;

d) repeating steps b–c using one or more second type of geometric analysis to generate subsequent set(s) of geometric areas to optimize the number of corresponding areas for a particular individual;

e) determining one or more mathematical relationship(s) between more than one said optimized corresponding geometrical areas within an exemplar signature that holds true for substantially each of said exemplar signatures in said exemplar library, thereby identifying optimized archetypical delimited areas;

f) obtaining one or more signature strings which are to be authenticated;

g) searching for said optimized archetypical delimited areas in said one or more unauthenticated signatures;

h) determining whether said corresponding optimized archetypical delimited areas of said one or more unauthenticated signatures display the same mathematical relationship(s) as said archetypical delimited areas with respect to said exemplar signatures; and i) rejecting as non-authenticate unauthenticated signatures failing to display the same mathematical relationship as said optimized archetypical delimited areas with respect to said exemplar signatures.

10. The method of claim 9 wherein the signature verification method is used to identify a person from a signature.

* * * * *